Aug. 24, 1954

M. EBER ET AL 2,686,958

METHOD OF COATING AND BONDING

Filed Nov. 14, 1950

INVENTORS
M. EBER
H. E. GALLAGHER,
W. J. KNOCHEL.
BY

ATTORNEY

Patented Aug. 24, 1954

2,686,958

UNITED STATES PATENT OFFICE 2,686,958

METHOD OF COATING AND BONDING

Mortimer Eber and William J. Knochel, East Orange, and Hayden E. Gallagher, Montclair, N. J., assignors to Westinghouse Electric Corporation, East Pittsburgh, Pa., a corporation of Pennsylvania Application November 14, 1950, Serial No. 195,686

2 Claims. (Cl. 29—179.5)

This invention relates to getters and more particularly to the means and methods of gettering deleterious occluded gases emitted in the forming of a vacuum-tight metal ceramic joint in electrical apparatus such as electronic tubes and the like.

Reference is made to pending application for Letters Patent of the United States Serial No. 182,593, filed August 31, 1950, by Mortimer Eber for "Production of Seals Between Metals and Ceramics," assigned to the same assignee, wherein the currently used method of the prior art is disclosed.

The above mentioned method of making a metal to ceramic seal consists first of painting the surface area to be joined of a ceramic disc with a hydride of a metal or plurality of hydrides of the metals of the group consisting of zirconium, titanium, tantalum, columbium, vanadium, and thorium. The brazing material, usually pure silver or silver copper alloy solder, is positioned above the peripheral juncture of the painted ceramic disc and a hollow metal cylinder having an annular rabbet machined in the juncture end to receive said disc with a small amount of clearance. The assembly, namely, painted disc, metal cylinder and solder, is suitably induction heated in a protective environment such as vacuum or purified inert gas as neon, argon, and the like until the metal hydride or plurality of metal hydrides is reduced to metal or metals on the surface area to be joined of the ceramic disc, and the solder is melted, forming a solid vacuum-tight seal between said ceramic disc and hollow metal cylinder.

Proposal has been made to vary the aforementioned practice by metallizing the painted surface area to be joined of the ceramic disc prior to joining to the hollow metal cylinder, in order to reduce gettering action of painted coating during said joining and to render to the painted surface a hardness resistant to chipping or scraping during the handling and fitting to said cylinder. Here the brazing material, usually pure silver or silver copper solder is positioned by fixtures on the top edge of the painted surface of the ceramic disc. Said painted ceramic disc and solder are induction heated in a protective environment as mentioned above until the metal hydride or plurality of metal hydrides are reduced to a metal or a plurality of metals on the painted surface of said disc, and the solder melts to form an inactive, durable, uninterrupted alloy with the metal or plurality of metals on said ceramic surface. The ceramic disc, now metallized or alloy coated on the surface to be joined, the hollow metal cylinder and appropriate solder usually silver copper alloy are then assembled, induction heated and joined together in a vacuum-tight seal as mentioned above.

Thus there are two modes of procedure, one case being the joining of an unmetallized painted ceramic disc and hollow metal cylinder and the other being the metallizing of a painted ceramic disc. However, in both cases, there is a metallic hydride or a plurality of metallic hydrides painted on the ceramic, and thereafter induction heated, said hydride or plurality of hydrides dissociates giving off hydrogen and leaves an active gettering metal or metals on the painted surface area of the ceramic disc. In the first case, namely joining of an unmetallized painted ceramic and a hollow metal cylinder, said gettering metal or metals absorb some of the deleterious occluded gases emitted from the hollow metal cylinder, unmetallized ceramic disc and solder and those gases residual in the vacuum system. In the second case, namely, metallizing of a painted ceramic, said metal or metals absorb similar gases emitted from the painted ceramic disc and metallizing solder and those gases residual in the vacuum system. Said absorption of said gas by the active metal or metals in both cases, causes contamination of said metal or metals and impairs their wetting characteristics.

An object of our invention is to provide for the absorption by an active gettering agent of the occluded deleterious gases emitted from the hollow metal cylinder, unmetallized painted ceramic disc and solder, and the residual deleterious gases of the vacuum system during the joining of said cylinder, disc and solder for forming a vacuum-tight metal ceramic seal, and to provide for maintenance of the wetting agent painted on the surface area to be joined of said disc, as an uncontaminated pure metal which loses none of its wetting characteristics during said above-mentioned joining operation.

A further object of our invention is to provide for the absorption by an active gettering agent of the occluded deleterious gases emitted from the painted ceramic disc and the metallizing solder and the residual deleterious gases of the vacuum system during the metallizing of said disc and to provide for the maintenance of the wetting agent painted on the surface area to be joined of the ceramic disc as an uncontaminated pure metal which loses none of its wetting characteristics during said above-mentioned metallizing operation.

Our invention further contemplates an improved method of producing a better vacuum in a metallic work chamber positioned in the vacuum bottle of an induction heating equipment through the use of an active gettering agent and metal diffusion and backer pump combination than is possible through the use of the metal diffusion and backer pump combination alone.

Other objects of the invention will appear to those skilled in the art to which it appertains as description thereof proceeds, both by direct recitation thereof and by implication from the context.

Referring to the accompanying drawing in which like numerals of reference indicate similar parts throughout the several views.

Figure 1:
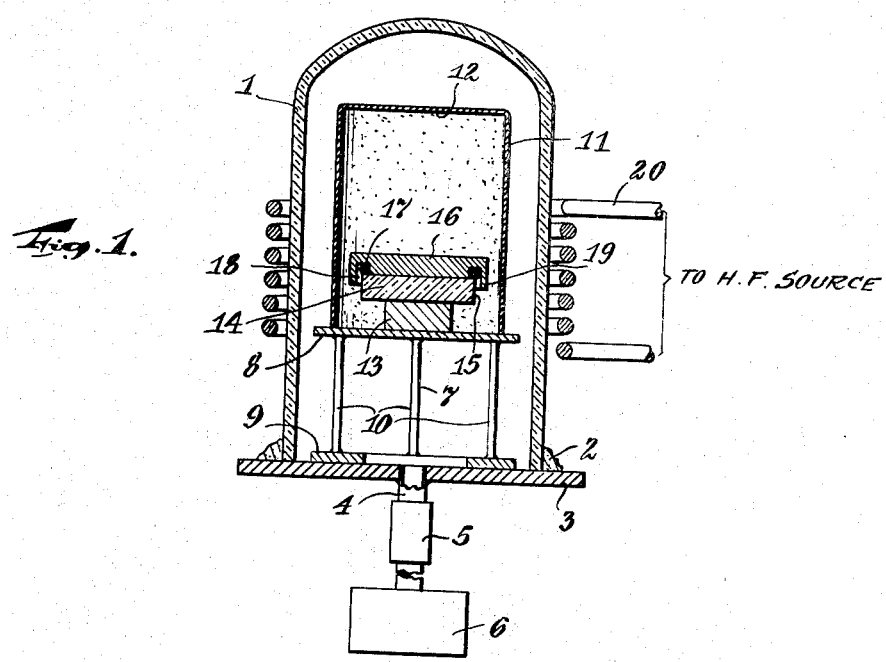
Fig. 1 is a section of an arbitrarily selected form of electrical device, namely an induction heating equipment, for metallizing a painted ceramic with a solder, wherein our invention is included.

Referring to said drawing, and initially to Fig. 1 thereof, the induction heating device for metallizing a painted ceramic with a solder, comprises a glass or quartz vacuum bottle 1 sealed with a vacuum sealing putty 2 to a circular brass supporting plate 3. Said plate 3 is soldered to an appropriate cylindrical brass exhaust pipe 4 connected in turn through a rubber hose 5 to an oil diffusion and backer pump combination 6 capable of evacuating said bottle 1 to a pressure of $1.0 \times 10^{-5}$ mm. of mercury or better.

Within said bottle 1 and supported by the top surface of plate 3 is a tripod 7 consisting of parallel top and bottom discs 8 and 9 respectively held in spaced relation by intervening upright rods 10, said tripod 7 preferably being made of low vapor pressure, high melting point material such as molybdenum or 18–8 steel. Situated on the upper surface of and supported by said top disc 8 is an inverted open-ended container functioning as a heat shield. As shown in Fig. 1, said container 11 is suitably cylindrical in shape and has its inner surface 12 painted with a gettering agent, such as a powder of a metal hydride suspended in a suitable vehicle and binder. Painted container 11 is then dried, for instance, in air or in a low temperature air furnace, until the gettering agent suspension adheres to the inner surface 12 of said container 11.

Inside container 11 on the upper surface of and fastened to top disc 8, is support 13, here conveniently cylindrical in shape, which supports the work, namely a ceramic disc 14 such as zircon. Prior to inclusion of the said ceramic disc 14 in said container 11 said disc is baked in air and painted on the surface area to be joined, 15, with a wetting agent, such as a powder of a metal hydride suspended in a suitable vehicle and binder. The painted ceramic disc 14 is then dried, for instance, in air or in a low temperature air furnace, until said wetting agent suspension adheres to the surface to be joined 15 of said disc 14.

Applied on the top surface of painted disc 14 is a flat round plate or fixture 16, functioning as a holding fixture for a ring of solder 17. Said solder may be pure silver solder (melting point 960° C.) or appropriate silver-copper alloy solder (melting point 779° C.) such as Handy & Harmon BT solder (72% silver–28% copper). Machined in the underface of said fixture 16 is a circular groove 18 rectangular in cross section, and with an approximate diameter of said disc 13. Said ring of solder 17 is placed in this groove 18 and juxtaposed to the peripheral edge of the disc 14. Radially beyond the groove 18, the fixture 16 has a peripheral flange 19 depending below the general underplane of the said fixture to overhang around the painted surface area 15. This flange 19 directs the flow of the solder 17, when it melts, along the painted surface area 15. In one specific example of apparatus and work, the outside diameter of disc 14 is approximately two inches larger than that of the support 13 to provide a free-way for the excess of solder 17 to fall clear from the work onto top disc 8. Support 13 and fixture 16, mentioned above, are preferably nongaseous, high melting point material, such as tantalum or 18–8 steel.

Applied coaxially around the vacuum bottle 1 and extending symmetrically along the length of open-ended container 11 is an appropriate high frequency induction coil 20 which fits over vacuum bottle 1 with approximately ¼ inch clearance. Said coil 20 inductively heats container 11 which in turn raises, by radiation, the temperature of the included parts, namely support 13, disc 14, fixture 16 and solder 17 to the melting point of the solder 17. During this induction heating operation the gettering agent on the inner surface 12 of container 11 becomes an active getter for deleterious gases before and during the time the wetting agent on the surface to be joined, 15, of disc 14 is subject to the contamination by the above mentioned deleterious gases. When solder 17 melts, it forms a smooth inactive durable alloy with the uncontaminated wetting agent metal on the surface to be joined 15, of disc 14, thereby metallizing said surface 15.

After cooling, metallized ceramic disc 14 is removed from the induction heating equipment for metallizing said ceramic disc 14 (Fig. 1) and transferred to an induction heating equipment (not shown either in Fig. 1 or Fig. 2) for joining said metallized ceramic disc 14 at its metallized periphery to a hollow metal cylinder.

Figure 2:
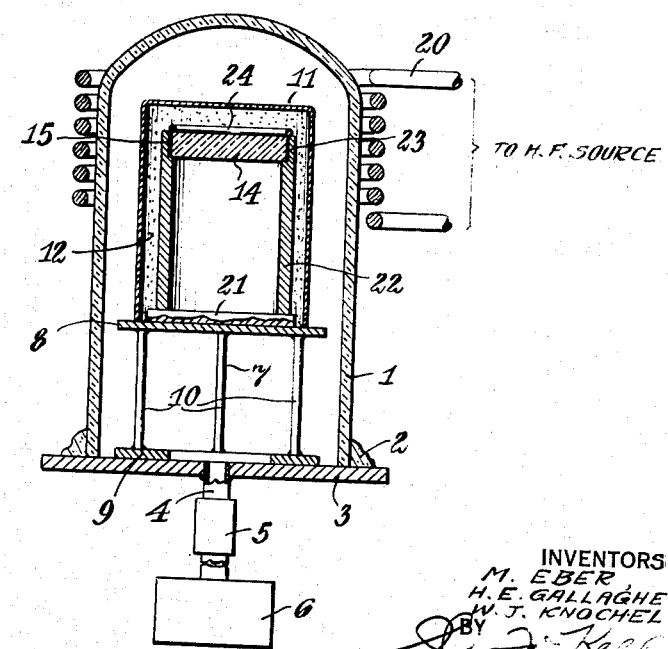
Fig. 2 is also a section of said arbitrarily selected induction heating equipment differing from Fig. 1 only in the holding fixture and insulator required to join an unmetallized painted ceramic to a hollow metal cylinder wherein our invention also is included.

Referring to Fig. 2, the induction heating device for joining an unmetallized painted ceramic to a hollow metal cylinder differs from the induction heating device of Fig. 1, solely in fixtures and members within container 11. Referring specifically to top disc 8 of tripod 7, there is supported on the upper surface of said disc 8, a zircon heat insulator 21, the purpose of which is the insulation of top disc 8 from the work, which in this instance is a hollow cylinder 22 conveniently of nickel-cobalt-iron. Said cylinder 22 is superimposed on the upper surface of insulator 21 and has an annular rabbet 23 machined in the upper end to receive and support concentrically a ceramic disc 14. Said disc 14 has been baked in air, painted on the surface area to be joined 15 with a wetting agent namely, powder of a metal hydride suspended in a suitable vehicle and binder, and then baked in air or in a low temperature air furnace thereby causing said suspended power to adhere to said surface 15, as previously described with respect to Fig. 1. The flange portion of said rabbet 23 preferably has a wall thickness of approximately .010″ so that the resulting joint of cylinder 22 and painted ceramic 14, when heated in its ultimate use, will be in a state of compression.

On the top of and at the peripheral juncture between the cylinder 22 and unmetallized painted ceramic 14 is positioned an appropriate ring of solder 24, such as Handy & Harmon BT solder (72% silver–28% copper). Insulator 21, cylinder 22, as well as said ceramic disc 14 and solder 24 are coaxially aligned and in a state of parallelism with the sides of container 11. Again, as in Fig. 1, applied coaxially around vacuum bottle 1 and extending symmetrically along the length of container 11 is an appropriate high frequency induction coil 20 which is capable of heating said container 11 to a very high temperature. The included parts within container 11, namely insulator 21 and the work, cylinder 22, unmetallized painted ceramic 14 and solder 24 are heated by radiation from container 11 to the melting point temperature of solder 24. During this induction heating the gettering agent, on the inner surface 12 of container 11, dissociates and becomes an active getter. As an active getter it absorbs the evolved deleterious gases before and during the time the wetting agent on the surface to be joined 15, of disc 14 dissociates and becomes exposed to said deleterious gas contamination. When the solder 24 melts, it flows into the peripheral juncture of cylinder 22 and ceramic 14, thereby forming, upon cooling, a vacuum-tight joint between cylinder 22 and ceramic 14.

According to the present invention, in the case of metallizing a ceramic prior to joining said ceramic to a metal member with brazing material, we prepare the suitable ceramic disc 14 for painting by heating said part in air to a temperature of approximately 1000° C. for ½ hour to burn off undesirable impurities in the ceramic 14.

Use may be made of a wetting agent suspension of titanium hydride powder, as one example selected from the hydrides of the metals of a group consisting of zirconium, titanium, tantalum, columbium, vanadium and thorium, in an appropriate vehicle, such as, equal parts by volume of amyl acetate and acetone solution, with, perhaps as much as, one percent by volume of nitrocellulose binder to insure adhesion of the suspension to the disc 14. Said suspension is painted on the surface area to be joined, 15, of disc 14. The inner surface 12 of container 11 is cleaned by sandblasting or other convenient mechanical means, such as wire brushing, and painted with a gettering agent suspension, such as, zirconium hydride powder suitably chosen from the hydrides of metals of the above mentioned group, in an appropriate vehicle and binder as mentioned above. The container 11 and painted disc 14 are then dried in air at room temperatures or air fired at 100° C. for 5 minutes to evaporate the vehicle and cause adhesion of the gettering agent to the inner surface 12 of said container 11, and adhesion of the wetting agent to surface area 15 of disc 14. The work consisting of container 11, disc 14 and solder 17, is now positioned in the induction heating equipment described above with respect to Fig. 1 and bottle 1 is evacuated to a pressure of $1.25 \times 10^{-5}$ mm. of mercury. Induction heating causes the container 11 to become very hot and the included parts, namely, support 13, disc 14, fixture 16 and solder 17 are heated, by radiation from aforesaid container 11, slowly over a period to the melting point temperature of the solder. The gettering agent, for instance, zirconium hydride, on inner surface 12 of container 11 has reached necessary temperature because of its inductive position with respect to coil 20 and has completely dissociated into liberated hydrogen and pure zirconium on aforementioned inner surface 11. This dissociation takes place before and during the time the wetting agent titanium hydride on the surface area to be joined 15 of included disc 14 dissociates. The liberated hydrogen from this reaction is evacuated from the bottle. Thus the active gettering agent, in this case, zirconium, on said surface 12, functioning as an auxiliary pump, within the induction heating device, is able to absorb and complete the elimination of the deleterious occluded and the residual gases. This gettering action by the zirconium or the like on surface 12 prevents the contamination of the wetting agent, such as the titanium on surface 15. Said titanium on surface 15 remains pure and loses none of its wetting characteristics. When the pure silver solder 17 melts, it flows over said pure titanium on surface 15, to form an alloy of silver and titanium. The induction heating power is shut off and the now metallized ceramic disc 14 is removed from the induction heating equipment in Fig. 1. The metallized ceramic disc 14 is later joined to a hollow metal cylinder in an induction heating device not herein described.

According to our invention in the case of joining an unmetallized painted ceramic to a metal member with solder the conveniently selected ceramic disc 14 is baked in air at approximately 1000° C. for ½ hour to remove residual impurities. The surface area to be joined, 15, of said disc 14 is painted with a wetting agent suspension such as titanium hydride powder suitably selected from the hydrides of a metal of the group consisting of zirconium, titanium, tantalum, columbium, vanadium, and thorium, in an appropriate vehicle such as, equal parts by volume of amyl acetate and acetone solutions and binder, such as nitrocellulose. If, after painting said disc 14 and before including it in the bottle 1, the zirconium gettering layer on the inner surface 12 of container 11 appears to be losing its gettering efficiency or appears oxidized, said zirconium is removed from the inner surface 12 by sandblasting or other mechanical means such as wire brushing. Then the inner surface 12 is repainted with a gettering agent suspension, such as zirconium hydride powder, an arbitrarily selected hydride of a metal of the above mentioned group in a suitable vehicle and binder as mentioned above. The properly painted container 11 and painted disc 14 are dried in air at room temperatures or baked in an air furnace at 100° C. for 5 minutes to evaporate the vehicle and effect the adhesion of the gettering agent zirconium hydride powder to the inner surface 12 of container 11 and of the wetting agent titanium hydride powder to the surface area 15 of disc 14 in the specific example given. After painting and drying, container 11 and ceramic disc 14 are assembled with the insulator 21, cylinder 22, and solder 24 as explained above in the induction heating equipment of Fig. 2.

When the bottle 1 is evacuated to a pressure of $1.25 \times 10^{-5}$ mm. of mercury, the container 11 is induction heated sufficiently to raise the temperature of the included parts, namely, insulator 21, cylinder 22, unmetallized ceramic 14 and solder 24, by radiation from said container 11, slowly to the melting point temperature of the solder 24. Because of its position on the inner surface 12 of container 11 the gettering agent, as zirconium hydride, reaches said temperature and dissociates completely into pure zirconium on surface 12 and hydrogen before and during the time the wetting agent, as titanium hydride, on surface area 15 of disc 14 dissociates. The zirconium on surface 12 operating as a pump within container 11 auxiliary to aforementioned external metal diffusion and backer pump combination 6, readily absorbs the deleterious occluded gases given off by above mentioned parts included in container 11 and the residual gases released by the induction heating device. By such time as the wetting agent, titanium hydride, on surface 15 has dissociated and at the same time could become an active gettering material namely, pure titanium, all contaminating gases have either been absorbed by the zirconium, on surface 12, or evacuated by said pump combination 6. Said titanium on surface 14 remains uncontaminated and readily wettable by solder 24. When the solder 24 melts, it flows into the peripheral juncture of cylinder 22 and ceramic 14, joining said cylinder 22 and ceramic 14 in a vacuum-tight joint.

It will be understood by those familiar with the art that choice of a metal hydride as gettering agent and another metal hydride as wetting agent is not limited to the specific cases described above. The position of the gettering agent on the inner surface of the container during induction heating, rather than the specific choice of hydride of a metal of the group consisting of zirconium, titanium, tantalum, columbium, vanadium, and thorium as gettering agent, activates the gettering agent before and during the dissociating of the wetting agent. Any hydride of a metal of the above mentioned group and any combination of two or more hydrides of metals of the above mentioned group may be used either as gettering agent on the inner surface of said container or as wetting agent on the surface area to be joined of said disc.

It will be further understood that such use of a gettering agent, namely, the painting of a hydride of a metal of the above mentioned group of two or more hydrides of metals of the group mentioned above, on the inner surface of a metallic work chamber enclosed in a convenient vacuum induction heating device similar to Fig. 1 or Fig. 2 and induction heating said work chamber, will produce a higher vacuum within said chamber than is practical with ordinary diffusion and backer pump combinations. The active getter within the chamber functions as a high vacuum pump in series with said diffusion and backer pump combination, and produces a higher vacuum in the metal work chamber than in the surrounding vacuum bottle.

From the foregoing, it will be seen that we have devised an improved method for maintaining an uncontaminated wetting agent herein described as a metal hydride or hydrides painted on the ceramic member surface area to be metallized by a solder, by activating a gettering agent, such as a metal hydride or hydrides painted on the inner surface of a metal work chamber, enclosing said painted ceramic, for absorbing deleterious gases of the metallizing operation before and during the time the wetting agent on said ceramic is being activated.

We have also devised an improved method for maintaining a pure wetting agent, herein described as a metal hydride or hydrides painted on the surface area to be joined by solder to a hollow metal cylinder of a ceramic member by rendering a gettering agent, such as a metal hydride or hydrides painted on the inner surface of a metal work chamber enclosing said painted ceramic, cylinder and solder, capable of absorption of deleterious gases resulting from the joining operation before and during the time the wetting agent on said ceramic is being rendered capable of wetting with said solder.

We have further devised a unique method for producing a higher vacuum within a metal work chamber in a vacuum system than is possible with ordinary diffusion and backer pump combinations by activating with heat a gettering agent, a metal hydride or hydrides painted on the inner surface of said chamber thereby absorbing deleterious residual gases within said chamber.

Although preferred embodiments of our invention have been disclosed, it will be understood that modifications may be made within the spirit and scope of the appended claims.

We claim:

1. A method for maintaining a pure wetting agent on a ceramic body while metallizing said body comprising: painting the surface area to be metallized of said body with a wetting agent, namely a plurality of hydrides of the metals of the group consisting of zirconium, titanium, tantalum, columbium, vanadium, and thorium; painting the inner surface of a metal work chamber with a gettering agent, namely a plurality of hydrides of the metals of the above mentioned group; assembling said body with a solder within said chamber in an inert protective environment; heating said chamber to dissociate the metal hydrides on said surface of said chamber into liberated hydrogen and active gettering metals; further heating of said chamber and said body, in turn, by inward radiation from said chamber to further activate said gettering metals and to dissociate the metal hydrides on said body into liberated hydrogen and active wetting metals; still further heating said chamber and said body and solder to still further activate said gettering metals and to melt the solder, thereby forming an alloy of said solder and the uncontaminated wetting metals and metallizing said ceramic therewith.

2. A method for maintaining a pure wetting agent on a ceramic body while joining said body to a metal member comprising: painting the surface area to be joined of said ceramic body with a wetting agent, namely a plurality of hydrides of the metals of the group consisting of zirconium, titanium, tantalum, columbium, vanadium, and thorium; painting the inner surface of a metal work chamber with a gettering agent, namely a plurality of hydrides of the metals of the above-mentioned group; assembling said body and metal member with a solder within said container in an inert protective environment; heating said chamber to dissociate the metal hydrides on said surface of said chamber into liberated hydrogen and active gettering metals; further heating of said chamber and said body, in turn, by inward radiation from said chamber to further activate said gettering metals and to dissociate the metal hydrides on said body into liberated hydrogen and active wetting metals; still further heating said chamber and said body, metal surface, and said solder to still further activate said gettering metals and to melt the solder, thereby both forming an alloy of said solder with the uncontaminated wetting metals on said body and joining said ceramic member and said metal surface therewith.

(References on following page)

References Cited in the file of this patent

UNITED STATES PATENTS

| Number | Name | Date |
|---|---|---|
| 1,110,576 | Von Recklinghausen | Sept. 15, 1914 |
| 1,584,728 | Case | May 18, 1926 |
| 1,626,639 | Sproesser | May 3, 1927 |
| 1,958,967 | Kniepen | May 15, 1934 |
| 2,114,692 | Ward | Apr. 19, 1938 |
| 2,116,432 | Gustin | May 3, 1938 |
| 2,133,492 | Vatter | Oct. 18, 1938 |
| 2,147,418 | Bahls | Feb. 14, 1939 |
| 2,164,332 | Macksoud | July 4, 1939 |
| 2,229,436 | Beggs | Jan. 21, 1941 |
| 2,230,205 | Rowland | Jan. 28, 1941 |
| 2,263,164 | Dailey | Nov. 18, 1941 |
| 2,282,106 | Underwood | May 5, 1942 |
| 2,283,883 | Conconi | May 19, 1942 |
| 2,362,468 | Clark | Nov. 14, 1944 |

OTHER REFERENCES

Pearsall, C. S.: "New Brazing Method for Joining Non-Metallic Materials to Metals," published "Materials and Methods," July 1949, pages 61 and 62.

Bondley, R. J.: "Metal-Ceramic Brazed Seals," published "Electronics," volume 28, July 1947, pages 97–99.